```
PREPOLYMER OF
GLYCIDYL METHACRYLATE
METHACRYLONITRILE &
METHYL METHACRYLATE
```

```
AROMATIC AMINE,
DIEPOXIDE &
CATALYST
```

```
STRUCTURAL
THERMOSET
```

SANTOKH S. LABANA
SEYMOUR NEWMAN
JOHN F. FELLERS
    INVENTOR:

BY John R. Faulkner
   Olin B. Johnson
        ATTORNEYS

United States Patent Office 3,652,476
Patented Mar. 28, 1972

3,652,476
THERMOSET MOLDING POWDERS EMPLOYING GLYCIDYL METHACRYLATE AND AROMATIC AMINES
John F. Fellers, Livonia, Santokh S. Labana, Dearborn Heights, and Seymour Newman, Southfield, Mich., assignors to Ford Motor Company, Dearborn, Mich.
Filed June 5, 1970, Ser. No. 43,895
Int. Cl. C08f 45/22
U.S. Cl. 260—29.1 R
19 Claims

ABSTRACT OF THE DISCLOSURE

Novel thermosetting resin powders which can be molded to form products characterized, in tensile measurement, by high elongation-to-break, high strength and modulus and by a high glass transition temperature are prepared from a mixture of a prepolymer consisting essentially of glycidyl methacrylate, methyl methacrylate, and methacrylonitrile or acrylonitrile and an amine crosslinking agent.

---

This invention relates to self-crosslinking, dry, thermosettable molding powders suitable for rapid curing during processing as by compression and injection molding and applicable to the production of rigid, tough, structural materials as, for instance, automobile body panels, electrical appliance housings, boat construction, storage tanks, conduits, particularly those for the transmission of heated fluids, etc., and to molded articles produced therefrom.

The thermosets of this invention, after molding, have a glass transition temperature above 90° C., preferably above 120° C. At room temperature (20°–25° C.) these moldings exhibit, in tensile measurement, a strength in the range of about 6,000 to about 12,000 p.s.i. or higher, a modulus in the range of about 600,000 to about 1,000,000 p.s.i. or higher and elongation-to-break in the range of about 2 to about 6% or higher.

Glass transition temperature is that temperature at which a glass-like material loses its rigidity and hardness and approaches the behavior of an elastomer. More specifically, glass transition temperature is defined as the temperature at which such material shows a maximum in its mechanical damping at low frequencies, e.g. about 1 cycle per second.

(I) COMPOSITION OF THE PREPOLYMER

The prepolymer has at least three constituent monomers and, except for limited substitution as hereinafter noted, has the following basic composition:

| | Wt. percent |
|---|---|
| Glycidyl methacrylate | 15–35 |
| Methacrylonitrile | 10–30 |
| Methyl methacrylate | Balance |

Acrylonitrile may be substituted in whole or in part for the methacrylonitrile but the latter is the preferred reactant in that products produced from prepolymers containing this constituent and the crosslinking agents used herein have a higher heat distortion (glass transition) temperature than do the corresponding products using acrylonitrile, all other factors being equal.

A minor portion of the methyl methacrylate, preferably not more than ⅓ thereof, may be replaced with styrene, vinyl acetate or a different ester of acrylic or methacrylic acid and a monohydric alcohol, preferably a $C_3$–$C_4$ alcohol, e.g. ethyl acrylate, butyl acrylate, butyl methacrylate, etc. This substitute should not exceed about 15 weight percent of the total monomers used to form the prepolymer and preferably does not exceed 10% of the same. In the case of the $C_4$ substitutes, this component preferably does not exceed ⅕ of the methyl methacrylate. The substitutes mentioned in this paragraph, with the exception of styrene, increase the flexibility of the polymer, i.e. the elongation-to-break factor, and decrease the softening point (glass transition temperature).

(II) PROPERTIES OF THE PREPOLYMER

The prepolymer has an average molecular weight in the range of about 1,500 to about 16,000, preferably about 2,000 to about 10,000, and more preferably about 3,500 to about 8,000, as determined by vapor phase osmometry using methyl ethyl ketone as solvent. Less than about 5% of the molecules thereof should have a molecular weight below about 1,000.

The prepolymer has a softening point above 25° C., preferably in the range of about 50° to about 130° C.

(III) PREPARATION OF THE PREPOLYMER

The prepolymer is advantageously formed by solution polymerization using heat, a free radical initiator and an inert solvent. The prepolymer is preferably recovered by coagulation. Hexane, a mixture of hexane and toluene, etc., are suitable for this purpose. It may be recovered by evaporation but if this embodiment is used the product should be washed with a suitable solvent to remove low molecular weight components.

A free radical initiator is dissolved in the combined monomeric reactants and is advantageously employed in an amount equal to about 1–4 wt. percent of the combined monomer weight. Conventional free radical initiators are suitable for this purpose, e.g. acylperoxides, preesters, and azo compounds. Specific materials which have been used successfully include 2,2′-azobis(2-methyl propionitrile) hereinafter termed AIBN, benzoyl peroxide, t-butyl perbenzoate, and t-butyl peroxypivalate.

As aforementioned, the reaction is carried out in an inert solvent, e.g. toluene or a mixture of toluene and dioxane, etc. Advantageously, the weight of the solvent is equal to or in excess of the combined weight of the reactant and the initiator.

In a preferred method of preparation, the monomeric reactants and the free radical initiator are added in small increments, e.g. dropwise, to the solvent heated to reflux under nitrogen. When addition is complete, initiator in the amount of about 0.1% monomer weight is dissolved in a small amount of solvent and added over a period of 20–60 minutes. The reflux is then continued for about 2 hours. The prepolymer is then recovered by coagulation. This is preferably effected in the following manner. The reaction solution is further diluted with additional solvent until the prepolymer comprises about 20 to about 30 weight percent of the resultant solution. This solution is then added slowly to a liquid that will effect precipitation of the prepolymer. In this instance, hexane is quite suitable. A fine powder precipitates. This is recovered by filtration, dried, and, if necessary, broken up by rolling or grinding.

In addition to the aforedescribed method of prepolymer preparation, the prepolymer can be formed by the well-known techniques of emulsion polymerization, bulk polymerization and suspension polymerization. Suspension polymerization is preferably carried out using water as the suspending medium. Since ionic stabilizers react with glycidyl methacrylate, only nonionic materials may be used for stabilizing the suspension. Polyvinyl alcohol and an alkyl aryl polyether alcohol (Triton X 100—Rohm and Haas Co.) have been found quite satisfactory. To carry out suspension polymerization, the monomer mixture is added to cooled (about 0° C.) 0.1% solution of polyvinyl alcohol in water. The mixture is stirred rapidly and the initiator added over a period of about 30 minutes.

The temperature of the reaction mixture is then controlled to remain between 55° and 60° C. for six to eight hours. After cooling to room temperature, the polymer is collected by filtration. Because the polymerization must be carried out below 65° C., only the initiators which are an efficient source of free radicals below this temperature may be used. Suitable initiators for suspension polymerization include t-butyl peroxypivalate and diisopropyl peroxycarbonate. The molecular weight of the prepolymer can be controlled, among other ways, by using 0.1 to about 5 weight percent (based on monomer weight) of a chain transfer agent such as lauryl mercaptan.

(IV) CROSSLINKING AGENT

The crosslinking agent used in this invention is an aromatic amine having one or more, preferably two, primary amine groups. These may be monomeric or polymeric. A preferred amine is 4,4'-methylenedianiline. Other suitable amines include: 4,4'-dithiodianiline; 4,4'-oxydianiline; 4,4'-sulfonyldianiline; 4,4'-(2,2'-butane) dianiline; 3,3'-sulfonyldianiline; 4-chloro-m-phenylenediamine; 4-chloro-o-phenylenediamine; benzidine (4,4'-dianiline); 3,3'-diaminobenzidine; 1,5-diaminonaphthalene; 2,4-diaminotoluene; 2,5-diaminotoluene; 4,4'-methylene bis-(o-chloroaniline); o - phenylenediamine; m - phenylenediamine; p-phenylenediamine, etc.

The crosslinking agent is employed in sufficient quantity to provide 0.75 to 1.5, preferably about 1.0 and below about 1.35, and most preferably between about 1.15 and about 1.30, active amine hydrogen atoms, i.e. hydrogen atoms directly attached to an amine nitrogen, for every epoxy group in the prepolymer. An amine to epoxide ratio within the preferred range has been found to give the best combination of strength properties and glass transition temperature.

(V) CATALYST

A catalyst is employed in the molding powder mix to facilitate the crosslinking reaction. Suitable catalysts include urea, methyl urea, imidazoles such as 2-methyl imidazole, 2-methyl-4-ethyl imidazole, boron trifluoride complexes, e.g. boron trifluoride-monoethyl amine, boron trifluoride-phenolate-polyethylene glycol, etc. These catalysts are found to be latent catalysts for amine-epoxy reactions. That is to say that the catalysts do not significantly enhance the rate of reaction at room temperature but are effective only above certain temperatures. The catalysts that are latent up to at least 50° C. are to be preferred. Non-latent catalysts such as salicylic acid, stannic chloride, stannous octoate, if used, give molding powders with short storage life and frequently poor flow in the mold. Catalyst is advantageously used in the amount of about 0.5 to 3% by weight of the molding powder, varying with the time and temperature of the molding cycle.

(VI) ADDITIVE

In the method of this invention, there is advantageously added to the molding powder a minor amount of reactive diluents to lower the melt viscosity thereof. This reactive diluent must be difunctional, liquid at 100° C. or below. It will comprise about 1.0 to about 15, preferably about 5 to about 10, weight percent of the molding powder.

In a preferred embodiment, the reactive diluent is a diepoxide having a molecular weight in the range of about 200 to about 1,000 and viscosities at 100° C. of less than 50 poises.

The diepoxide may be an aromatic, an aliphatic or a cycloaliphatic diepoxide. Such diepoxides should consist essentially of carbon, hydrogen and oxygen and may have substituents which do not interfere with crosslinking reaction, e.g. sulfonyl groups, nitro groups, alkylthio groups and halogens.

Typical examples of reactive diluents include diglycidyl esters of polybasic or dibasic acids, as disclosed in U.S. Pat. No. 2,866,767; diglycidyl ethers of dihydric phenols as disclosed in U.S. Pats. Nos. 2,467,171; 2,506,486; 2,640,037 and 2,841,595; diglycidyl ethers of diols as disclosed in U.S. Pats. Nos. 2,538,072 and 2,581,464 and diepoxides obtained by peracid epoxidation of dienes. Although the diepoxides are to be preferred for the present invention, low viscosity polyepoxides may also be advantageously used.

Suitable aromatic diepoxides are commercially available. These include commercially available epoxy resins of the Bisphenol-A-epichlorohydrin type, each of which is represented by the following formula:

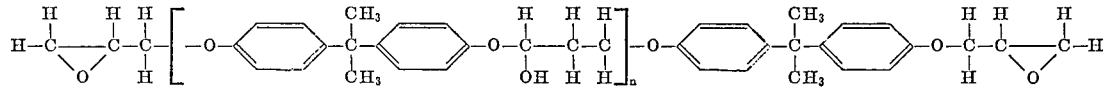

These resins have the following typical properties:

| Trademark [1] | Melting range, ° C. | Viscosity in poise at 25° | Epoxide equivalent [2] | Equivalent weight [3] | Molecular weight average | n in the formula [3] average value |
|---|---|---|---|---|---|---|
| Epon 828 | Liquid | 100–150 | 175–210 | 85 | 380 | |
| Epon 834 | Liquid | [4] 3.8 | 225–290 | 105 | 470 | 0.5 |
| Epon 1001 | 64–76 | [5] 0.8–1.7 | 450–525 | 130 | 900 | 2.0 |

[1] Shell Chemical Co.—In Europe the trade name "Epikote" followed by the same figures.
[2] Gram of resin containing 1 g.-equivalent of epoxide.
[3] Gram of resin required to esterify completely 1 mole of a monobasic acid, e.g. 280 grams of a $C_{18}$ fatty acid.
[4] Available as a 70% solution in butyl Carbitol.
[5] Available as a 40% solution in butyl Carbitol.

Suitable aliphatic diepoxides can be synthesized by methods well known to the art and are also commercially available.

For example, a suitable aliphatic diepoxide may be synthesized in the following manner: to a 2,000 ml., 3-neck flask equipped with stirrer, dropping funnel, thermometer and nitrogen inlet, is added 1 mole of 2,3-butanediol (91.12 gms.) and 4 moles of epichlorohydrin (370.0 gms.). The temperature is maintained at 110° C. while 2 moles sodium hydroxide (80.0 gms.) is added dropwise as a 30% aqueous solution. The rate of addition is regulated so that the reaction mixture remains neutral. After about 3 hours, the organic layer is separated, dried, distilled, and a polymer is recovered. This polymeric product is represented by the following structural formula:

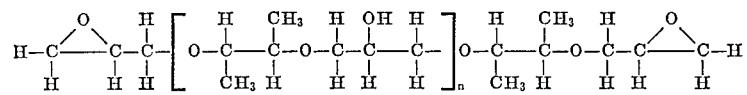

An aliphatic diepoxide, 1,4-butanediol diglycidyl ether, is commercially available. This diepoxide has a viscosity of 15 cps. at 25° C. and an epoxy value of 0.75 eq./100 grams. Cycloaliphatic diepoxides are also commercially available. Aliphatic or cycloaliphatic epoxy additives are recommended where moldings with superior outdoor weathering are needed.

The quantitative employment of the reactive diluent is such that the softening point of the molding powder prior to thermosetting remains above 25° C. and preferably above 40° C. Generally, aliphatic and cycloaliphatic epoxy diluents are used in 1.0 to 15, preferably 5 to 10% weight of the total molding powder. Aromatic epoxy compounds are used in slightly larger amounts.

An alternative to the use of the reactive plasticizer is to increase the amount of low molecular weight molecules in the prepolymer. This is less desirable because of high consumption of expensive free radical initiators and because extreme care must be exercised to avoid undue loss of mechanical properties in the resultant product.

In still another embodiment, the molding powder contains about 0.1 to about 5 weight percent of a nonreactive diluent having molecular weight in the range of about 200 to about 1,000 and viscosity at 100° C. of less than 50 poises.

(VII) PREPARATION OF THE MOLDING POWDER MIX

The powdered prepolymer, the crosslinking agent, the catalyst, and the reactive or unreactive plasticizer, when used, are dissolved in a suitable solvent, e.g. acetone, methylene chloride, benzene, etc., and the solution is thoroughly stirred. The solvent is evaporated under vacuum leaving a solid cake which is crushed to a fine powder. The powder is further dried under vacuum so that it contains less than one percent of the solvent.

Alternatively, to the prepolymer solution as obtained by polymerization are added crosslinking agent, reactive diluent, if any, and the catalyst. The solution is stirred until homogeneous and then added slowly to a vigorously stirred precipitating solvent such as hexane. The precipitated powder is dried under vacuum. To ensure its homogeneity, the molding powder is passed through a roll mill at 50° to 100° C. In lieu of employing the precipitation solvent and roll mill, one may merely evaporate the solvent of the prepolymer solution.

Another method of preparing the molding powder consists of mixing together the powdered prepolymer, crosslinking agent, additives and catalyst and homogenizing by passing through an extrusion mixer or a roll mill.

If desired, reinforcing fillers such as asbestos, glass fibers, clay, calcium carbonate, calcium silicate, etc., may also be incorporated in the molding powders. These fillers are useful to increase the strength and heat distortion temperature of the finished product.

The powders thus prepared are suitable for use in injection molding, compression molding and transfer molding.

This invention will be more fully understood from the following illustrative examples wherein tensile properties of the molded specimens are determined by Tensile Test, American Society for Testing Materials D–638 (1961) with the overall sample length at 2 inches and the parallel guage section length at ½ inch. The prepolymers in the foregoing examples have softening points between 50° and 130° C. with less than 5% of the molecules thereof having molecular weight below 1,000.

Example 1

A prepolymer is prepared from the following components in the manner hereinafter set forth:

Reactants: Grams
Glycidyl methacrylate _____ 120
Methyl methacrylate _____ 160
Methacrylonitrile _____ 120

The above named reactants and 8 grams benzoyl peroxide are mixed and added dropwise over a 3 hour period into 500 grams toluene at 110°–111° C. under nitrogen atmosphere. Then 0.2 gram of benzoyl peroxide dissolved in 50 ml. of toluene are added over a ½ hour period and refluxing continued for 3 hours.

On cooling, the solution becomes cloudy. There is added 500 ml. of acetone and a clear solution is obtained. By evaporating solvent under vacuum, the solid content of the solution is found to be 32.9%. The prepolymer powder was titrated in CHCl$_3$ using the method described by R. R. Jay (Analytical Chemistry, 36, 667–668 (1964) using tetrabutyl ammonium iodide and 0.1 normal HClO$_4$ in dry acetic acid. The molecular weight per epoxide group of the powder, hereinafter referred to as WPE, is found to be 495. The epoxy equivalent weight of the prepolymer solution, hereinafter referred to as EEW, as determined by titration is 1500.

The prepolymer solution in the amount of 75 grams and 3.75 grams of methylene dianiline are mixed with 100 ml. acetone. This mix is coagulated in 400 ml. hexane. It is separated from the hexane and dried at 55° C. for 6 hours under 0.5 mm. vacuum. The white, dry, molding powder is recovered. It has a gel time of 2½ minutes at 150° C. and 5 minutes at 118° C.

A sheet molded from this powder at 350° F. for 45 minutes under a pressure of 8500 pounds per square inch, the pressure used for molding all subsequent examples herein unless otherwise stated is colorless to slightly yellow, and essentially insoluble in acetone. This sheet demonstrates the following properties when tested:

Tensile properties:
Strength, p.s.i. _____ 9890
Elongation-to-break, percent _____ 2.2
Modulus, p.s.i. _____ 620,000
Glass transition temp., ° C. _____ 120

A 300-gram portion of prepolymer solution prepared as described above, 20 grams methylene dianiline and 500 grams acetone are combined. This mix is coagulated in 3.5 liters of n-hexane and dried at 60° C. for 1 hour under 1 mm. Hg pressure. The resultant powder is molded at 410° F. for 45 minutes. A transparent, slightly yellow sheet is obtained. This sheet exhibits no swelling in acetone (while soaking overnight in acetone less than 5% acetone, basis weight of sheet, is absorbed) demonstrating that the sheet material is crosslinked. A test of this material reveals that it has the following properties:

Tensile properties:
Strength, p.s.i. _____ 10,300
Elongation-to-break, percent _____ 2.5
Modulus, p.s.i. _____ 968,200

A 150-gram portion of prepolymer solution prepared as described above, 5 grams of methylene dianiline and 500 ml. acetone are mixed together. The prepolymer-amine coagulant is recovered and dried at 45° C. for 3 hours under 1 mm. Hg pressure. This powder is molded at 380° F. for 35 minutes. A clear sheet is obtained with the following properties:

Tensile properties:
Strength, p.s.i. _____ 10,600
Elongation-to-break, percent _____ 2.0
Tensile modulus, p.s.i. _____ 860,400
Glass transition temperature _____ 130

Example 2

Ten (10) grams of the prepolymer powder (WPE 495) prepared in Example 1 is admixed with 4 grams of methylene dianiline, 0.1 gram boron trifluoride monoethylamine, and 13 grams of a commercially available diepoxide represented by the following formula:

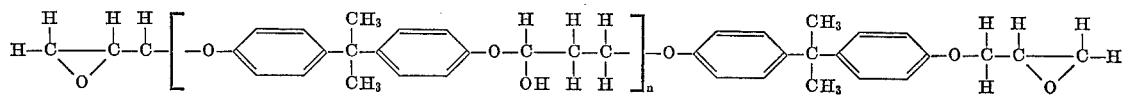

and having the following typical properties: liquid at room temperature, viscosity in poise at 25° C. of 100–150, epoxide equivalent 192 (grams of resin containing 1 gram equivalent of epoxide), and average molecular weight of about 385. This mix is dissolved in 100 ml. of methylene chloride. The solution is dried at 60° C. under vacuum for 4 hours. The resultant dry powder becomes fluid at 110° C. and gels at 125° C. when the temperature is raised at the rate of 5° C. per minute.

A 3 inch-diameter, circular sheet of 0.050 inch average thickness is molded from this powder at 375° F. under 9000 p.s.i. for 20 minutes. A transparent sheet is obtained having the following properties:

Tensile properties:
    Strength, p.s.i. _____ 9800
    Elongation-to-break, percent _____ 2.5
    Modulus, p.s.i. _____ 720,000
Glass transition temp., ° C. _____ 130

Example 3

A prepolymer is prepared from the following components in the manner hereinafter set forth:

Reactants:                                    Grams
    Glycidyl methacrylate _____ 175
    Methacrylonitrile _____ 50
    Methyl methacrylate _____ 275

The above named reactants are admixed with 8.0 grams azobisiso-butyronitrile (2,2′-azobis - 2 - methyl propionitrile), hereinafter referred to as AIBN and added dropwise to 400 grams of refluxing toluene under nitrogen. After complete addition, 0.5 gram of AIBN in 50 ml. of toluene are added dropwise over a 20 minute period. The solution is cooled and diluted with 500 ml. of acetone. The EEW of the prepolymer solution by titration is 1450. A part of this solution is dried by evaporating the solvent to obtain solid prepolymer. The WPE of the prepolymer solid is 405.

There is admixed 100 grams of this prepolymer solution, 4.1 grams methylene dianiline and 0.8 grams borontrifluoride phenolate polyethylene glycol. This is stirred until solution is complete. The solvent is evaporated at 65° C. under 0.5 mm. Hg for 6 hours. The dry powder recovered is molded at 390° F. for 45 minutes. The resulting sheet has the following properties:

Tensile properties:
    Strength, p.s.i. _____ 10,780
    Elongation-to-break, percent _____ 2.6
    Modulus, p.s.i. _____ 848,000

Example 4

A 60-gram portion of the prepolymer solution described in Example 3, 2.5 grams p-aminophenyl ether and 0.3 gram of borontrifluoride phenolate polyethylene glycol are mixed together. This is stirred at 50° C. until complete solution is obtained. The solvent is evaporated and the powder dried at 60° C. under vacuum. This powder is molded at 400° F. for 45 minutes.

Tensile properties:
    Strength, p.s.i. _____ 11,323
    Elongation-to-break, percent _____ 3.4
    Modulus, p.s.i. _____ 892,000

Example 5

The procedure of Example 3 is repeated with the difference that the prepolymer reactants are as follows:

Reactants:                                    Grams
    Glycidyl methacrylate _____ 175
    Methacrylonitrile _____ 100
    Methyl methacrylate _____ 225

The WPE of the prepolymer solid is 405. The EEW of the reaction solution is 1445.

A 60-gram portion of this prepolymer solution, 2.5 grams methylene dianiline and 0.5 gram borontrifluoride phenolate polyethylene glycol are mixed together and stirred to complete solution. The solvent is evaporated under vacuum at 60° C. The foam obtained is ground to a fine powder and further dried at 50° C. under 0.1 mm. Hg pressure for 2 hours. This powder is molded at 400° F. for 30 minutes. The sheet obtained has the following properties:

Tensile properties:
    Strength, p.s.i. _____ 12,289
    Elongation-to-break, percent _____ 3.2
    Modulus, p.s.i. _____ 968,610
Glass transition temp., ° C. _____ 135

Example 6

The procedure of Example 3 is repeated with the difference that the prepolymer reactants are as follows:

Reactants:                                    Grams
    Glycidyl methacrylate _____ 175
    Methacrylonitrile _____ 125
    Methyl methacrylate _____ 225

The WPE of the solid prepolymer is 405. The EEW of the prepolymer reaction solution is 1435.

A solution is formed of 60 grams of this prepolymer solution, 2.5 grams methylene dianiline, 0.9 gram stanneous octoate. The solution is stirred and the solvent is evaporated under vacuum. The resultant powder is molded at 400° F. for 30 minutes. The resultant sheet has the following properties:

Tensile properties:
    Strength, p.s.i. _____ 12,256
    Elongation-to-break, percent _____ 3.6
    Modulus, p.s.i. _____ 968,956
Glass transition temp., ° C. _____ 150

A second solution is formed of 90 grams of this prepolymer solution, 32 grams of a prepolymer solution prepared in the same manner but wherein the reactants are 175 grams glycidyl methacrylate and 325 grams ethyl acrylate and 5.0 grams of methylene dianiline. The solution is thoroughly stirred and the solvent is evaporated at 40° C. under vacuum. The powder obtained is molded at 400° F. for 30 minutes. The molded sheet has the following properties:

Tensile properties:
    Strength, p.s.i. _____ 9585
    Elongation-to-break, percent _____ 4.7
    Modulus, p.s.i. _____ 751,342
Glass transition temp., ° C. _____ 115–125

Example 7

A prepolymer is prepared from the following components in the manner hereinafter set forth:

Reactants:                                    Grams
    Glycidyl methacrylate _____ 175
    Methacrylonitrile _____ 125
    Methyl methacrylate _____ 200

The reactants are admixed with 10.0 grams t-butyl-peroxypivalate and dropped slowly into 5,000 ml. distilled water containing 0.2% of high molecular weight (M.W.—60,000) polyvinyl alcohol at 55° C. under nitrogen and rapidly stirred.

After the addition, the mixture was stirred at 55° C. for 3 hours. The reaction mix was then cooled to room temperature and the prepolymer isolated by filtration, washed with 1,000 ml. of water, washed with 500 ml. of methanol and dried at 55°–60° C. under vacuum. Prepolymer yield was 450 grams.

Example 8

The procedure of Example 7 is repeated except that an equivalent amount of diisopropyl peroxydicarbonate is substituted for the t-butyl peroxypivalate.

Example 9

A prepolymer solution is prepared from the following components in the manner hereinafter set forth:

| Reactants: | Grams |
| --- | --- |
| Glycidyl methacrylate | 450 |
| Methacrylonitrile | 450 |
| Methyl methacrylate | 600 |

These reactants are mixed with 30 grams AIBN (hereinbefore fully named) and introduced dropwise into a refluxing mixture of 1500 ml. toluene and 500 ml. dioxane (108°–111° C.) maintained in a nitrogen atomsphere. When addition is complete, there is added to the reaction mix 1.5 grams AIBN and reflux is continued for 2 hours. The EEW of the prepolymer reaction solution is 960. A solution is formed from 48 grams of this prepolymer solution, 2.0 grams methylene dianiline, 0.5 gram m-phenylene diamine, and 0.7 gram borontrifluoride phenolate polyethylene glycol. This solution is stirred thoroughly and the solvent is removed under vacuum. The foam product is further dried at 50° C. for 2 hours under vacuum and molded at 390° F. for 30 minutes. The properties of the resultant sheet are found to be as follows:

Tensile properties:
| | |
| --- | --- |
| Strength, p.s.i. | 11,800 |
| Elongation-to-break, percent | 2.5 |
| Modulus, p.s.i. | 902,940 |

This sheet is post cured at 385° F. for 1 hour and is then found to have the following properties:

Tensile properties:
| | |
| --- | --- |
| Strength, p.s.i. | 11,120 |
| Elongation-to-break, percent | 2.7 |
| Modulus, p.s.i. | 894,200 |

Example 10

A solution is prepared from 48 grams of the prepolymer solution of Example 9, 26 grams of a prepolymer solution prepared in like manner but employing as the reactants 175 grams glycidyl methacrylate and 325 grams ethyl acrylate, 30 grams methylene dianiline, 0.8 gram m-phenylene diamine, and 0.8 gram borontrifluoride phenolate polyethylene glycol. The mix is stirred until solution is complete. The solvent is removed by evaporation under vacuum and the resulting powder is dried. This powder is then molded at 400° F. for 30 minutes. The molded product has the following properties.

Tensile properties:
| | |
| --- | --- |
| Strength, p.s.i. | 7750 |
| Elongation-to-break | 3.6 |
| Modulus, p.s.i. | 659,116 |

Example 11

A prepolymer is prepared from the following components in the manner hereinafter set forth:

| Reactants: | Grams |
| --- | --- |
| Glycidyl methacrylate | 175 |
| Methacrylonitrile | 100 |
| Methyl methacrylate | 225 |

These reactants are mixed with 10 grams AIBN and over a 4 hour period are added dropwise into a refluxing solution of 500 ml. toluene and 75 ml. dioxane. When addition is complete, 0.5 gram AIBN in 50 ml. toluene are added dropwise over a ½ hour period. The solution is refluxed for an additional 2 hours. The prepolymer powder is recovered as in the previous examples by evaporation of the solvent under vacuum followed by drying.

Thirty (30) grams of this powder are admixed with 4.2 grams of a commercially available polymeric amine with equivalent weight per reactive amine hydrogen of 54 (Vandrox 20—R. T. Vanderbilt Co.) and 0.6 gram 2-methyl-4-ethyl imidazole.

This mixture is dissolved in 100 ml. of acetone. The solvent is evaporated as in the previous examples and the product is dried. The resultant powder is molded at 390° F. for 30 minutes. The resultant shaped article has the following properties:

Tensile properties:
| | |
| --- | --- |
| Strength, p.s.i. | 11,300 |
| Elongation-to-break, percent | 2.9 |
| Modulus, p.s.i. | 820,000 |
| Glass transition temp., ° C. | 153 |

Example 12

A prepolymer is prepared from the following materials in the following manner:

| Reactants: | Grams |
| --- | --- |
| Glycidyl methacrylate | 150 |
| Methacrylonitrile | 262 |
| Methyl methacrylate | 338 |

These materials are mixed with 30 grams AIBN. This mix is added dropwise to a refluxing solution of 750 ml. toluene and 250 ml. dioxane in a nitrogen atmosphere. When addition is complete, 1.0 AIBN in 50 ml. toluene is added dropwise to the solution. The solution is refluxed for an additional 2.5 hours. This solution is added dropwise into rapidly stirred n-hexane. The precipitate is collected and dried under vacuum at 65° C. for 6–8 hours. The weight per epoxide of the prepolymer is 460.

A mix is made of 69 grams of this prepolymer powder, 9.4 grams methylene dianiline, and 0.6 gram 2-methyl-4-ethyl imidazole. This mix is dissolved in dichloromethane. The solvent is evaporated under vacuum and the powder is dried. This powder is molded at 385° F. for 10 minutes. The resulting shaped article has the following properties:

Tensile properties:
| | |
| --- | --- |
| Strength, p.s.i. | 12,180 |
| Elongation-to-break, percent | 4.9 |
| Modulus, p.s.i. | 756,400 |
| Glass transition temp., ° C. | 127 |

Example 13

Additional moldings are prepared to further illustrate the effect of compositional changes in the prepolymer. These moldings are prepared using the following procedure:

(1) mix monomers for prepolymer with reaction initiator
(2) drop mixture (1) slowly into equal amount of refluxing toluene (110–111° C.) under nitrogen atmosphere with stirring
(3) when addition (2) is complete add 0.1% initiator (basis weight of reactants) in 15 ml. toluene to the stirred reaction mix (2)
(4) continue heating of the reaction mix for 2–3 hours
(5) dilute reaction mix to 30% solids with acetone
(6) coagulate prepolymer in 5–7 volumes hexane
(7) recover prepolymer precipitate and dry same (8) mix resultant prepolymer powder with crosslinking agent (amine) and catalyst in methylene chloride (9) evaporate methylene chloride under vacuum

(10) mold

The materials for preparing the moldings and the test results of such moldings are set forth in the following table:

and crosslinking agent. The procedure of preparation followed is the same as in Example 13. The materials

TABLE I.—EFFECT OF PREPOLYMER COMPOSITION

| | Prepolymer composition | | | | | Molding powder | | | Cure | | Properties | | | |
|---|---|---|---|---|---|---|---|---|---|---|---|---|---|---|
| Number | WPE[1] | GMA[2] | MAN[3] | MMA[4] | RI[5] | Prepolymer, g. | Cross-linking Ag | Stoichiometry | Catalyst | Temp., °F. | Time, min. | TS,[6] p.s.i. | TE,[7] percent | TM,[8] p.s.i. | GT,[9] °C. |
| 1 | 710 | 100 g.,[10] 20% | | 400 g., 80% | AIBN,[11] 10 g., 2% | 71 | 5.75 g. MDA[12] | 1.25 | BF₃·MEA,[13] 1.2 g., 1.5% | 385 | 30 | 4,870 | 0.6 | 810,000 | 110 |
| 2 | 568 | 100 g., 25% | | 300 g., 75% | AIBN, 8 g., 2% | 56.8 | 5.75 g. MDA | 1.25 | BF₃·MEA, 0.93 g., 1.5% | 385 | 30 | 7,820 | 1.0 | 750,000 | 115 |
| 3 | 426 | 150 g., 33.3% | | 300 g., 66.7% | AIBN, 9 g., 2% | 42.6 | 5.75 g. MDA | 1.25 | BF₃·MEA, 0.72 g., 1.5% | 385 | 30 | 8,970 | 1.2 | 766,000 | 120 |
| 4 | 355 | 200 g., 40% | | 300 g., 60% | AIBN, 10 g., 2% | 35.5 | 5.75 g. MDA | 1.25 | BF₃·MEA, 0.61 g., 1.5% | 385 | 30 | 8,820 | 1.1 | 805,000 | 130 |
| 5 | 292 | 284 g., 51% | | 300 g., 51% | AIBN, 11.6 g., 2% | 29.2 | 5.75 g. MDA | 1.25 | BF₃·MEA, 0.53 g., 1.5% | 385 | 30 | 8,850 | 1.0 | 840,000 | 150 |
| 6 | 405 | 175 g., 35% | 25 g., 5% | 300 g., 60% | AIBN, 10 g., 2% | 41 | 5.0 g. MDA | 1.0 | BF₃·MEA, 0.7 g., 1.5% | 385 | 30 | 9,110 | 1.5 | 680,000 | 130 |
| 7 | 405 | 175 g., 35% | 50 g., 10% | 275 g., 55% | AIBN, 10 g., 2% | 41 | 5.0 g. MDA | 1.0 | BF₃·MEA, 0.7 g., 1.5% | 390 | 45 | 10,780 | 2.6 | 848,000 | 135 |
| 8 | | 175 g., 35% | 50 g., 10% | 275 g., 55% | AIBN, 10 g., 2% | 41 | 5.0 g. 4,4′-diamino diphenyl ether | 1.0 | BF₃·MEA, 0.7 g., 1.5% | 400 | 45 | 11,323 | 3.4 | 802,000 | 135 |
| 9 | | 175 g., 35% | 75 g., 15% | 250 g., 50% | AIBN, 10 g., 2% | 20.5 | 2.5 g. MDA | 1.0 | BF₃,phenolate PE glycol,[14] 1.5% | 380 | 45 | 11,500 | 3.6 | 895,000 | 138 |
| 10 | | 175 g., 35% | 100 g., 20% | 225 g., 45% | AIBN, 10 g., 2% | 20.5 | 2.5 g. MDA | 1.0 | BF₃,phenolate PE glycol, 1.5% | 380 | 45 | 11,700 | 3.8 | 887,000 | 143 |
| 11 | | 175 g., 35% | 125 g., 25% | 200 g., 40% | AIBN, 10 g., 2% | 21 | 2.6 g. MDA | 1.0 | do | 390 | 45 | 11,000 | 4.0 | 865,000 | 145 |
| 12 | | 175 g., 35% | 150 g., 30% | 175 g., 35% | AIBN, 10 g., 2% | 21 | 2.5 g. MDA | 1.0 | 2-methyl-4-ethyl imidazole | 380 | 30 | 11,800 | 3.0 | 841,500 | 145 |

[1] Molecular weight per epoxide group. [2] Glycidyl methacrylate. [3] Methacrylonitrile. [4] Methyl methacrylate. [5] Reaction initiator. [6] Tensile strength. [7] Tensile elongation-to-break. [8] Tensile modulus. [9] Glass transition temperature. [10] Grams. [11] 2,2′-azobis (2-methyl propionitrile). [12] Methylene dianiline. [13] Monoethyl amine. [14] Polyethylene glycol.

Example 14

Additional moldings are prepared to further illustrate the importance of the relative amounts of prepolymer used in preparing these moldings and the test results of these moldings are set forth in the following table:

TABLE II.—EFFECT OF RELATIVE CONCENTRATIONS OF PREPOLYMER AND CROSSLINKING AGENT

| | Prepolymer composition | | | | Molding powder | | | Cure | | Properties | | | |
|---|---|---|---|---|---|---|---|---|---|---|---|---|---|
| Number | GMA[2] | MAN[3] | MMA[4] | RI[5] | Prepolymer, g. | Cross-linking Ag | Stoichiometry | Catalyst | Temp., °F. | Time, min. | TS,[6] p.s.i. | TE,[7] percent | TM,[8] p.s.i. | GT,[9] °C. |
| 13 | 175 g., 35% | 100 g., 20% | 225 g., 45% | AIBN, 10 g., 2% | 21 | 2.5 g. MDA | 1.0 | 2-methyl-4-ethyl imidazole, 1.5% | 380 | 30 | 10,600 | 2.1 | 786,700 | 150 |
| 14 | 175 g., 35% | 100 g., 20% | 225 g., 45% | AIBN, 10 g., 2% | 21 | 2.5 g. MDA | 1.0 | do | 380 | 10 | 10,400 | 2.5 | 793,000 | 115 |
| 15 | 175 g., 35% | 100 g., 20% | 225 g., 45% | AIBN, 10 g., 2% | 21 | 2.9 g. MDA | 1.15 | do | 380 | 10 | 10,800 | 3.5 | 775,500 | 115 |
| 16 | 175 g., 35% | 100 g., 20% | 225 g., 45% | AIBN, 10 g., 2% | 21 | 3.1 g. MDA | 1.25 | 2-ethyl-4-methyl imidazole, 1.5% | 380 | 10 | 12,700 | 5.1 | 805,000 | 135 |
| 17 | 175 g., 35% | 100 g., 20% | 225 g., 45% | AIBN, 10 g., 2% | 21 | 3.8 g. MDA | 1.50 | 2-methyl-4-ethyl, 1.5% | 380 | 10 | 9,810 | 2.5 | 756,000 | 125 |
| 18 | 175 g., 35% | 100 g., 20% | 225 g., 45% | AIBN, 10 g., 2% | 21 | 4.3 g. MDA | 1.75 | do | 380 | 10 | 8,900 | 2.1 | 705,000 | 110 |

[1] Molecular weight per epoxide group. [2] Glycidyl methacrylate. [3] Methacrylonitrile. [4] Methyl methacrylate. [5] Reaction initiator. [6] Tensile strength. [7] Tensile elongation-to-break. [8] Tensile modulus. [9] Glass transition temperature. [10] Grams. [11] 2,2′-azobis (2-methyl propionitrile). [12] Methylene dianiline. [13] Monoethyl amine. [14] Polyethylene glycol.

art will be aware that modifications may be made therein without departing from the scope of the invention as set forth in the claims.

We claim:
1. A molding powder which comprises an intimate mixture of
   (a) a copolymer
      (1) consisting of about 15 to about 35 weight percent glycidyl methacrylate, about 10 to about 30 weight percent acrylonitrile or methacrylonitrile, and a remainder consisting essentially of methyl methacrylate, and
      (2) having average molecular weight in the range of about 1,500 to about 16,000 and epoxide groups in its molecular structure resultant of inclusion of said glycidyl methacrylate as a constituent monomer thereof, and
   (b) an aromatic amine having at least one primary amine group, said amine being present in sufficient quantity to provide 0.75 to 1.5 active amine hydrogens per each epoxy group in said mixture.
2. A molding powder in accordance with claim 1 wherein said aromatic amine has at least two primary amine groups per molecule.
3. A molding powder in accordance with claim 1 wherein said aromatic amine is present in sufficient quantity to provide between about 1.15 and about 1.30 active amine hydrogens per each epoxy group in said mixture.
4. A molding powder in accordance with claim 1 wherein said copolymer has average molecular weight in the range of about 2,000 to about 10,000 with less than 5 percent of the molecules thereof having molecular weight below 1,000.
5. A molding powder in accordance with claim 1 wherein said copolymer has average molecular weight in the range of about 4,000 to about 8,000 with less than 5 percent of the molecules thereof having molecular weight below 1,000.
6. A molding powder in accordance with claim 1 wherein said molding powder contains about 0.1 to about 5 weight percent of a nonreactive diluent having molecular weight in the range of about 200 to about 1,000 and viscosity at 100° C. of less than 50 poises.
7. A molding powder which comprises an intimate mixture of
   (a) a copolymer
      (1) consisting of about 15 to about 35 weight percent glycidyl methacrylate, about 10 to about 30 weight percent methacrylonitrile, and a remainder consisting essentially of methyl methacrylate, and
      (2) having average molecular weight in the range of about 2,000 to about 10,000 with less than 5 percent of the molecules thereof having molecular weight below 1,000, softening point above 25° C. and epoxide groups in its molecular structure resultant of inclusion of said glycidyl methacrylate as a constituent monomer thereof, and
   (b) an aromatic amine having at least one primary amine group, said amine being present in sufficient quantity to provide above 1.0 and below 1.35 active amine hydrogens per each epoxy group in said mixture.
8. A molding powder which comprises an intimate mixture of
   (a) a copolymer
      (1) consisting of about 15 to about 35 weight percent glycidyl methacrylate, about 10 to about 30 weight percent methacrylonitrile, and a remainder consisting essentially of methyl methacrylate, and
      (2) having average molecular weight in the range of about 3,500 to about 8,000 with less than 5 percent of the molecules thereof having molecular weight below 1,000, softening point in the range of 50° to 130° C., and epoxide groups in its molecular structure resultant of inclusion of said glycidyl methacrylate as a constituent monomer thereof, and
   (b) an aromatic amine having at least two primary amine groups per molecule, said amine being present in sufficient quantity to provide above 1.0 and below 1.35 active amine hydrogens per each epoxy group in said mixture.
9. A molding powder in accordance with claim 8 wherein said amine is present in sufficient quantity to provide 1.15 to 1.3 active amine hydrogens per each epoxy group in said mixture.
10. A molding powder which comprises an intimate mixture of
   (a) a copolymer
      (1) consisting of about 15 to about 35 weight percent glycidyl methacrylate, about 10 to about 30 weight percent acrylonitrile or methacrylonitrile, and a remainder consisting essentially of methyl methacrylate, and
      (2) having average molecular weight in the range of about 1,500 to about 16,000, softening point above 25° C., and epoxide groups in its molecular structure resultant of inclusion of said glycidyl methacrylate as a constituent monomer thereof, and
   (b) an aromatic amine having at least one primary amine group, and
   (c) a diepoxide having molecular weight in the range of about 200 to about 1,000 and viscosity at 100° C. of less than 50 poises, said amine being present in sufficient quantity to provide 0.75 to 1.5 active amine hydrogens per each epoxy group in said mixture and said diepoxide comprising between about 1.0 and about 15.0 weight percent of said mixture.
11. A molding powder in accordance with claim 10 wherein said aromatic amine has at least two primary amine groups per molecule and is present in sufficient quantity to provide between about 1.15 and 1.30 active amine hydrogens per each epoxy group in said mixture and said copolymer has a softening point in the range of 50° C. to 130° C.
12. A molding powder which comprises an intimate mixture of
   (a) a copolymer
      (1) consisting of about 15 to about 35 weight percent glycidyl methacrylate, about 10 to about 30 weight percent methacrylonitrile, and a remainder consisting essentially of methyl methacrylate,
      (2) having average molecular weight in the range of about 2,000 to about 10,000 with less than 5 percent of the molecules thereof having molecular weight below 1,000, softening point in the range of 50° to 130° C., and epoxide groups in its molecular structure resultant of inclusion of said glycidyl methacrylate as a constituent monomer thereof,
   (b) an aromatic amine having at least two primary amine groups per molecule, and
   (c) a diepoxide having molecular weight in the range of about 200 to about 1,000, viscosity at 100° C. of less than 50 poises, and consisting essentially of carbon, hydrogen and oxygen, said amine being present in sufficient quantity to provide above 1.0 and below 1.35 active amine hydrogens per each epoxy group in said mixture and said diepoxide comprising between about 1.0 and about 15.0 weight percent of said mixture.
13. A molding powder in accordance with claim 12 wherein said diepoxide is vinylcyclohexene diepoxide.

Example 15

Additional moldings are prepared to illustrate the importance of the molecular weight of the prepolymer. The procedure of preparation followed is the same as in Example 13. The materials used in preparing these moldings and the test results of these moldings are set forth in the following table:

TABLE III.—EFFECT OR PREPOLYMER MOLECULAR WEIGHT

| | | Prepolymer composition | | | | | Molding powder | | | Cure | | Properties | | | |
|---|---|---|---|---|---|---|---|---|---|---|---|---|---|---|---|
| Number | MWT | GMA[2] | MAN[3] | MMA[4] | RI[5] | Prepolymer, g. | Cross-linking Ag | Stoichiometry | Catalyst | Temp., °F. | Time, min. | TS,[6] p.s.i. | TE,[7] percent | TM,[8] p.s.i. | GT,[9] °C. |
| 9 | 10,200 | 262 | 150 | 338 | AIBN, 3 g. | 23 | 3.1 MDA | 1.25 | BF³ phenolate PE glycol, 0.026 g. | 385 | 30 | 8,700 | 4.7 | 460,000 | 130–160 |
| 20 | 6,000 | 175 | 100 | 225 | AIBN, 10 g. | 23 | 3.1 MDA | 1.25 | do | 385 | 30 | 8,700 | 4.8 | 600,000 | 130–160 |
| 21 | 4,000 | 150 | 262 | 338 | AIBN, 30 g. | 23 | 3.1 MDA | 1.25 | do | 385 | 30 | 8,700 | 4.8 | 470,000 | 125–150 |
| 22 | 2,100 | 70 | 40 | 90 | AIBN, 20 g. | 23 | 3.1 MDA | 1.25 | do | 385 | 30 | 8,700 | 2.0 | 460,000 | 105–135 |
| 23 | 1,600 | 70 | 40 | 90 | AIBN, 30 g. | 23 | 3.1 MDA | 1.25 | do | 385 | 30 | 8,700 | 1.3 | 460,000 | 95–120 |

[1] Molecular weight per epoxide group. [2] Glycidyl methacrylate. [3] Methacrylonitrile. [4] Methyl methacrylate. [5] Reaction initiator. [6] Tensile strength. [7] Tensile elongation-to-break. [8] Tensile modulus. [9] Glass transition temperature. [10] Grams. [11] 2,2′-azobis(2-methyl propionitrile). [12] Methylene dianiline. [13] Monoethyl amine. [14] Polyethylene glycol.

Example 16

Additional moldings are prepared to illustrate the addition of diepoxides as reactive diluents to the molding powder mix. The procedure of preparation exclusive of the diepoxides is the same as used in preparing these moldings and the results of these moldings are set forth in the following table:

TABLE IV.—MOLDING POWDERS WITH DIEPOXIDES ADDED

| | Prepolymer composition | | | | Molding powders | | | | Cure | | Properties | | | |
|---|---|---|---|---|---|---|---|---|---|---|---|---|---|---|
| Number | GMA[2] | MAN[3] | MMA[4] | RI[5] | Prepolymer, g. | Cross-linking Ag | Stoichiometry | Catalyst | Additives | Temp., °F. | Time, min. | TS,[6] p.s.i. | TE,[7] percent | TM,[8] p.s.i. | GT,[9] °C. |
| 24 | 175 | 100 | 225 | AIBN, 10 g. | 15 | 2.8 g. MDA | 1.25 | 0.2 g. BF₃MEA | 1.5 g. A[15] | 380 | 30 | 11,200 | 4.1 | 480,000 | 130–150 |
| 25 | 175 | 100 | 225 | AIBN, 10 g. | 15 | 2.65 g. MDA | 1.25 | 0.2 g. BF₃MEA | 1.5 g. B[16] | 380 | 45 | 7,800 | 1.5 | 440,000 | 100–120 |
| 26 | 175 | 100 | 225 | AIBN, 10 g. | 15 | 2.7 g. MDA | 1.25 | 0.2 g. BF₃MEA | 1.5 g. C[17] | 380 | 30 | 9,500 | 2.5 | 500,000 | 115–140 |
| 27 | 175 | 100 | 225 | AIBN, 10 g. | 15 | 2.8 g. MDA | 1.25 | 0.2 g. BF₃MEA | D[18] | 380 | 30 | 8,200 | 1.8 | 490,000 | |
| 28 | 175 | 100 | 225 | AIBN, 10 g. | 15 | 2.9 g. MDA | 1.25 | 0.2 g. BF₃MEA | E[19] | 380 | 30 | 8,400 | 1.7 | 485,000 | |

[1-14] Same as Table I. [15] 1,4 butanediol diglycidyl ether. [16] Di-3,4-epoxy cyclohexyl adipate. [17] Epon 828—formula and physical properties supra. [18] Resorcinal diglycidyl ether. [19] Vinylcyclohexene diepoxide.

Example 17

The preceding examples are repeated with the sole difference that an equimolar amount of acrylonitrile is substituted for the methacrylonitrile in the prepolymer.

Example 18

Examples 1–16 inclusive are repeated with the sole difference that 25%, 50% and 75% of the methacrylonitrile in the prepolymer is replaced with an equimolar amount of acrylonitrile.

Example 19

The preceding examples are repeated with the sole difference that 25% of the methyl methacrylate in the prepolymer is replaced with an equimolar amount of styrene.

Example 20

The preceding examples are repeated with the sole difference that 15% of the methyl methacrylate in the prepolymer is replaced with an equimolar amount of ethyl acrylate.

Example 21

The preceding examples are repeated with the sole difference that 5% of the methyl methacrylate in the prepolymer is replaced with an equimolar amount of butyl methacrylate.

Example 22

The preceding examples are repeated with the sole difference that 5% of the methyl methacrylate in the prepolymer is replaced with an equimolar amount of vinyl acetate.

Example 23

The procedures of the preceding examples are repeated with the sole difference that the molding powder mix contains about 3 wt. percent isopropyl azelate.

Example 24

The procedures of the preceding examples are repeated with the sole difference that the molding powder mix contains about 3 wt. percent dioctyl phthalate.

Example 25

The procedures of Example 16 are repeated except that separate tests are conducted using 1.0, 2.5, 5.0, 10.0 and 15 weight percent of the diepoxide basis total weight of the powder.

The foregoing examples are illustrative of the invention defined in the appended claims. Those skilled in the 14. A molding powder in accordance with claim 12 wherein said diepoxide comprises between 5 and 10 weight percent of said mixture.

15. A molded article having glass transition temperature above 90° C., tensile strength above about 6,000 p.s.i., tensile modulus above about 600,000 p.s.i., and tensile elongation-to-break above about 2 percent and formed from a molding powder which comprises an intimate mixture of
 (a) a copolymer
  (1) consisting of about 15 to about 35 weight percent glycidyl methacrylate, about 10 to about 30 weight percent acrylonitrile or methacrylonitrile, and a remainder consisting essentially of methyl methacrylate, and
  (2) having average molecular weight in the range of about 1,500 to about 16,000, softening point above 25° C., and epoxide groups in its molecular structure resultant of inclusion of said glycidyl methacrylate as a constituent monomer thereof, and
 (b) an aromatic amine having at least one primary amine group, said amine being present in sufficient quantity to provide 0.75 to 1.5 active amine hydrogens per each epoxy group in said mixture.

16. A molded article having glass transition temperature above 120° C., tensile strength above 6,000 p.s.i., tensile modulus above 600,000 p.s.i., and tensile elongation-to-break above 2 percent and formed from a molding powder which comprises an intimate mixture of
 (a) a compolymer
  (1) consisting of about 15 to about 35 weight percent glycidyl methacrylate, about 10 to about 30 weight percent methacrylonitrile, and a remainder consisting essentially of methyl methacrylate, and
  (2) having average molecular weight in the range of about 2,000 to about 10,000 with less than 5 percent of the molecules thereof having molecular weight below 1,000, softening point in the range of 50° to 130° C., and epoxide groups in its molecular structure resultant of inclusion of said glycidyl methacrylate as a constituent monomer thereof, and
 (b) an aromatic amine having at least two primary amine groups per molecule, said amine being present in sufficient quantity to provide above 1.0 and below about 1.35 active amine hydrogens per each epoxy group in said mixture.

17. A molded article having glass transition temperature above 120° C., tensile strength above 6,000 p.s.i., tensile modulus above 600,000 p.s.i., and tensile elongation-to-break above 2 percent and formed from a molding powder which comprises an intimate mixture of
 (a) a copolymer
  (1) consisting of about 15 to about 35 weight percent glycidyl methacrylate, about 10 to about 30 weight percent acrylonitrile or methacrylonitrile, and a remainder consisting essentially of methyl methacrylate, and
  (2) having average molecular weight in the range of about 2,000 to about 10,000, softening point above 25° C., and epoxide groups in its molecular structure resultant of inclusion of said glycidyl methacrylate as a constituent monomer thereof, and
 (b) an aromatic amine having at least one primary amine group, and
 (c) a diepoxide having molecular weight in the range of about 200 to about 1,000, viscosity at 100° C. of less than 50 poises, and consisting essentially of carbon, hydrogen and oxygen, said amine being present in sufficient quantity to provide 0.75 to 1.5 active amine hydrogens per each epoxy group in said mixture and said diepoxide comprising between about 1.0 and about 15.0 weight percent of said mixture.

18. A molded article having glass transition temperature above 120° C., tensile strength above 6,000 p.s.i., tensile modulus above 600,000, and tensile elongation-to-break above 2 percent and formed from a molding powder which comprises an intimate mixture of
 (a) a copolymer
  (1) consisting of about 15 to about 35 weight percent glycidyl methacrylate, about 10 to about 30 weight percent methacrylonitrile, and a remainder consisting essentially of methyl methacrylate, and
  (2) having average molecular weight in the range of about 2,000 to about 10,000 with less than 5 percent of the molecules thereof having molecular weight below 1,000, softening point in the range of 50° to 130° C., and epoxide groups in its molecular structure resultant of inclusion of said glycidyl methacrylate as a constituent monomer thereof,
 (b) an aromatic amine having at least one primary amine group per molecule, and
 (c) a diepoxide having molecular weight in the range of about 200 to about 1,000, viscosity at 100° C. of less than 50 poises, and consisting essentially of carbon, hydrogen and oxygen, said amine being present in sufficient quantity to provide above 1.0 and below 1.35 active amine hydrogens per each epoxy group in said mixture and said diepoxide comprising between about 1.0 and about 15 weight percent of said mixture.

19. A molded article having glass transition temperature above 120° C., tensile strength above 6,000 p.s.i., tensile modulus above 600,000 p.s.i., and tensile elongation-to-break above 2 percent and formed from a molding powder which comprises an intimate mixture of
 (a) a copolymer
  (1) consisting of about 15 to about 35 weight percent glycidyl methacrylate, about 10 to about 30 weight percent methacrylonitrile, and a remainder consisting essentially of methyl methacrylate, and
  (2) having average molecular weight in the range of about 3,500 to about 8,000 with less than 5 percent of the molecules thereof having molecular weight below 1,000, softening point in the range of 50° to 130° C., and epoxide groups in its molecular structure resultant of inclusion of said glycidyl methacrylate as a constituent monomer thereof,
 (b) an aromatic amine having at least two primary amine groups per molecule, and
 (c) a diepoxide having molecular weight in the range of about 200 to about 1,000, viscosity at 100° C. of less than 50 poises, and consisting essentially of carbon, hydrogen and oxygen, said amine being present in sufficient quantity to provide about 1.15 to about 1.30 active amine hydrogens per each epoxy group in said mixture and said diepoxide comprising between about 5 and about 10 weight percent of said mixture.

References Cited

UNITED STATES PATENTS

| | | | |
|---|---|---|---|
| 2,787,561 | 4/1957 | Sanders | 260—80.72 |
| 3,247,285 | 4/1966 | Belanger | 260—830 TW |
| 3,317,453 | 5/1967 | MacDonald et al. | 260—80.72 |

LEWIS T. JACOBS, Primary Examiner

U.S. Cl. X.R.

260—31.8 E, 80.72, 80.81, 830 TW